United States Patent [19]

Hsu

[11] Patent Number: 4,899,428

[45] Date of Patent: Feb. 13, 1990

[54] GOLF CLUB HANDLE SLEEVE ASSEMBLING MECHANISM

[76] Inventor: Kuo H. Hsu, 1 Fl., No. 1-2, Sec. 2, Hsin Sheng S. Rd., Taipei, Taiwan

[21] Appl. No.: 387,815

[22] Filed: Aug. 1, 1989

[51] Int. Cl.⁴ .............................................. B23P 19/04
[52] U.S. Cl. ...................................... 29/235; 29/252; 29/282
[58] Field of Search .................. 29/234, 235, 252, 282, 29/280, 255, 237, 450, 458, DIG. 1; 273/75, 81 R; 16/110 R, DIG. 12, DIG. 19

[56] References Cited

U.S. PATENT DOCUMENTS

| | | | |
|---|---|---|---|
| 3,606,326 | 9/1971 | Sparks et al. | 29/450 |
| 4,185,375 | 1/1980 | Brown | 29/450 |
| 4,653,170 | 3/1987 | Kelson | 29/450 |
| 4,677,872 | 7/1987 | Nishida et al. | 29/235 |

Primary Examiner—Robert C. Watson
Attorney, Agent, or Firm—Morton J. Rosenberg; David I. Klein

[57] ABSTRACT

A golf club handle sleeve assembling mechanism including a working table and a handle sleeve supporting and assembling unit. The working table has a first clamp device provided for clamping a golf club, and a head seat provided for supporting a golf club head. The handle sleeve supporting and assembling unit is disposed on one side of the working table and includes a first table slidable longitudinally relative to the golf club by means of an actuator; a second table is slidable relative to the first table by means of an actuator; a second clamp device is disposed on the second table for clamping a handle sleeve; three actuators, each with a draw hook, are provided radially around the handle sleeve at a front end of the handle sleeve for expanding the front end of the handle sleeve; an air blower is disposed on the first table and aligned with the handle sleeve; and a control box is provided on the first table for controlling the actuators and the air blower. The air blower starts blowing air into a rear end of the handle sleeve for swelling the handle sleeve when the front end of the handle sleeve contacts a handle portion of the golf club and is blocked by the handle portion of the golf club.

4 Claims, 5 Drawing Sheets

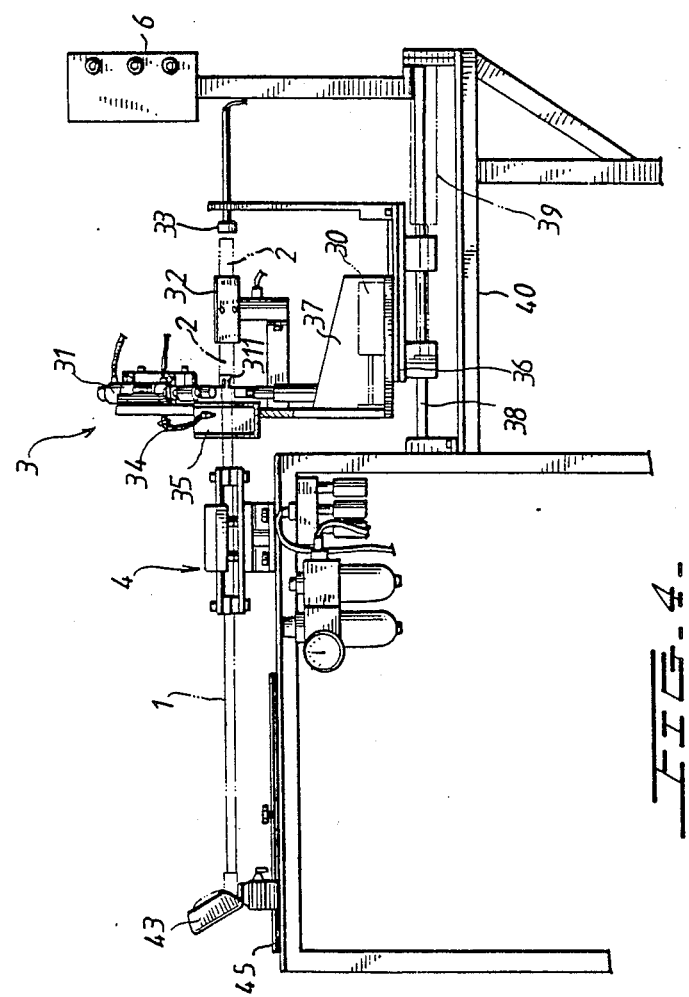

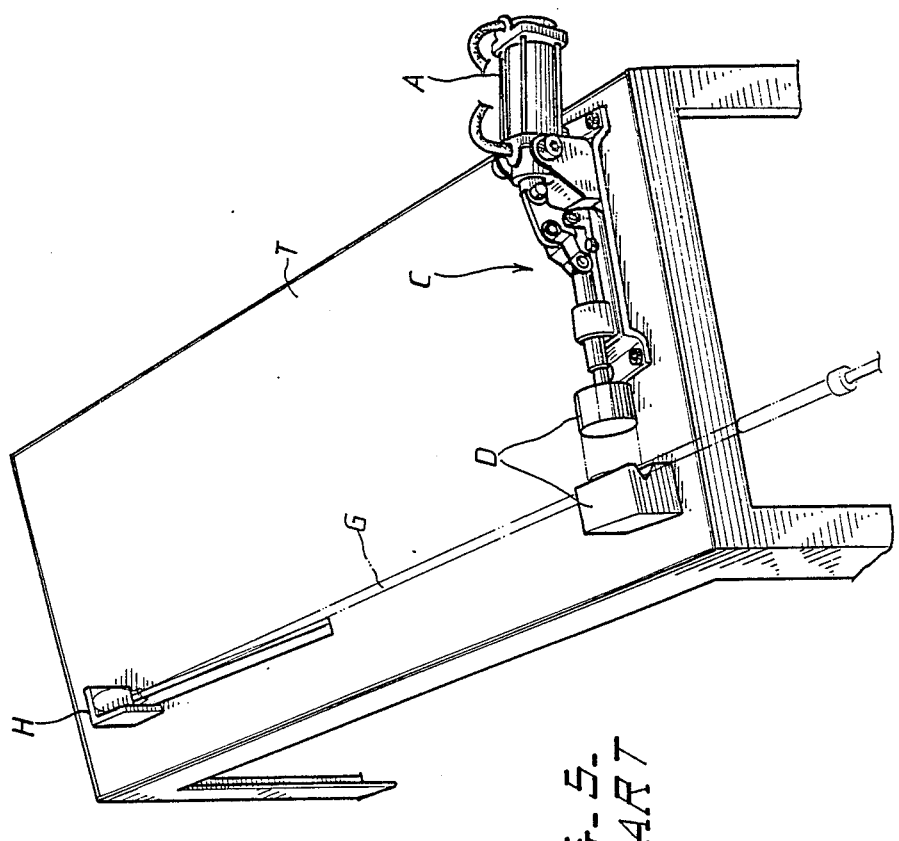

GOLF CLUB HANDLE SLEEVE ASSEMBLING MECHANISM

FIELD OF THE INVENTION

The present invention relates to an assembling mechanism, and more particularly to a golf club handle sleeve assembling mechanism.

BACKGROUND OF THE INVENTION

Generally, the trademark for golf clubs is provided on the handle sleeve of the golf club. The handle sleeve affects the quality and the usage of the golf club. Therefore, a high quality handle sleeve should be maintained.

A golf club handle sleeve clamping unit was developed as shown in FIG. 5. A club head seat H and a clamping unit C were provided on a table T. The clamping unit C had an actuator A for actuating a pair of clamping devices D to clamp a golf club G. Since the club head seat H was rigidly fixed on the table T, the seat H was suitable for supporting a golf club of a definite specification; e.g., No. 1 to 7 golf clubs. The club head seat H or the table T was changed for assembling different golf clubs of different specifications. The assembling processes of the handle sleeve onto a golf club was done manually. Therefore, skillful operators were required. Consequently, the productivity was low, the quality was not standardized, and the cost was high. Hence, conventional assembling processes did not enhance the marketability of the golf club.

The present invention has arisen to solve the assembly problems found in conventional golf club handle sleeve.

SUMMARY OF THE INVENTION

The primary object of the present invention is to provide a golf club handle sleeve assembling mechanism which is suitable for assembling the handle sleeve onto the golf club mechanically and automatically.

Another object of the present invention is to provide a golf club handle sleeve assembling mechanism which reduces manufacturing costs, and increases productivity while maintaining the quality of the golf club.

The present invention seeks to provide a golf club handle sleeve assembling mechanism including a working table and a handle sleeve supporting and assembling unit. The working table has a first clamp device provided for clamping a golf club, and a head seat provided for supporting a golf club head. The handle sleeve supporting and assembling unit is disposed on one side of the working table and includes : a first table slidable longitudinally relative to the golf club by means of an actuator; a second table slidable relative to the first table by means of an actuator; a second clamp device being disposed on the second table for clamping a handle sleeve; triple actuators, each with a draw hook, being provided radially around the handle sleeve at a front end of the handle sleeve for expanding the front end of the handle sleeve; an air blower being disposed on the first table and aligned with the handle sleeve; and a control box being provided on the first table for controlling the actuators and the air blower. The air blower starts blowing air into a rear end of the handle sleeve for swelling the handle sleeve when the front end of the handle sleeve contacts a handle portion of the golf club and is blocked by the handle portion of the golf club.

Further objects and advantages of the present invention will become apparent from a careful reading of the detailed description provided hereinbelow, with appropriate reference to the accompanying drawings.

BRIEF DESCRIPTION OF THE DRAWINGS

FIG. 4 is a front elevational view similar to FIG. 1, illustrating a movement of the handle sleeve supporting and assembling unit; and FIG. 5 is a perspective view of a conventional golf club clamping unit.

DETAILED DESCRIPTION OF THE INVENTION

Figure 1:
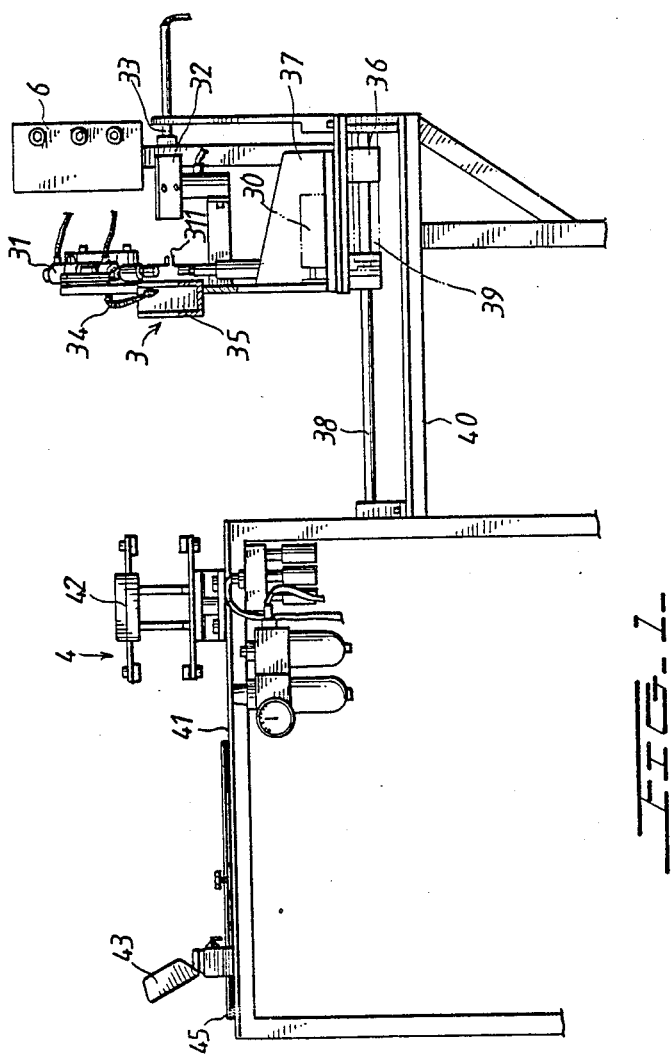
FIG. 1 is a front elevational view of a golf club handle sleeve assembling mechanism in accordance with the present invention.
Figure 2:
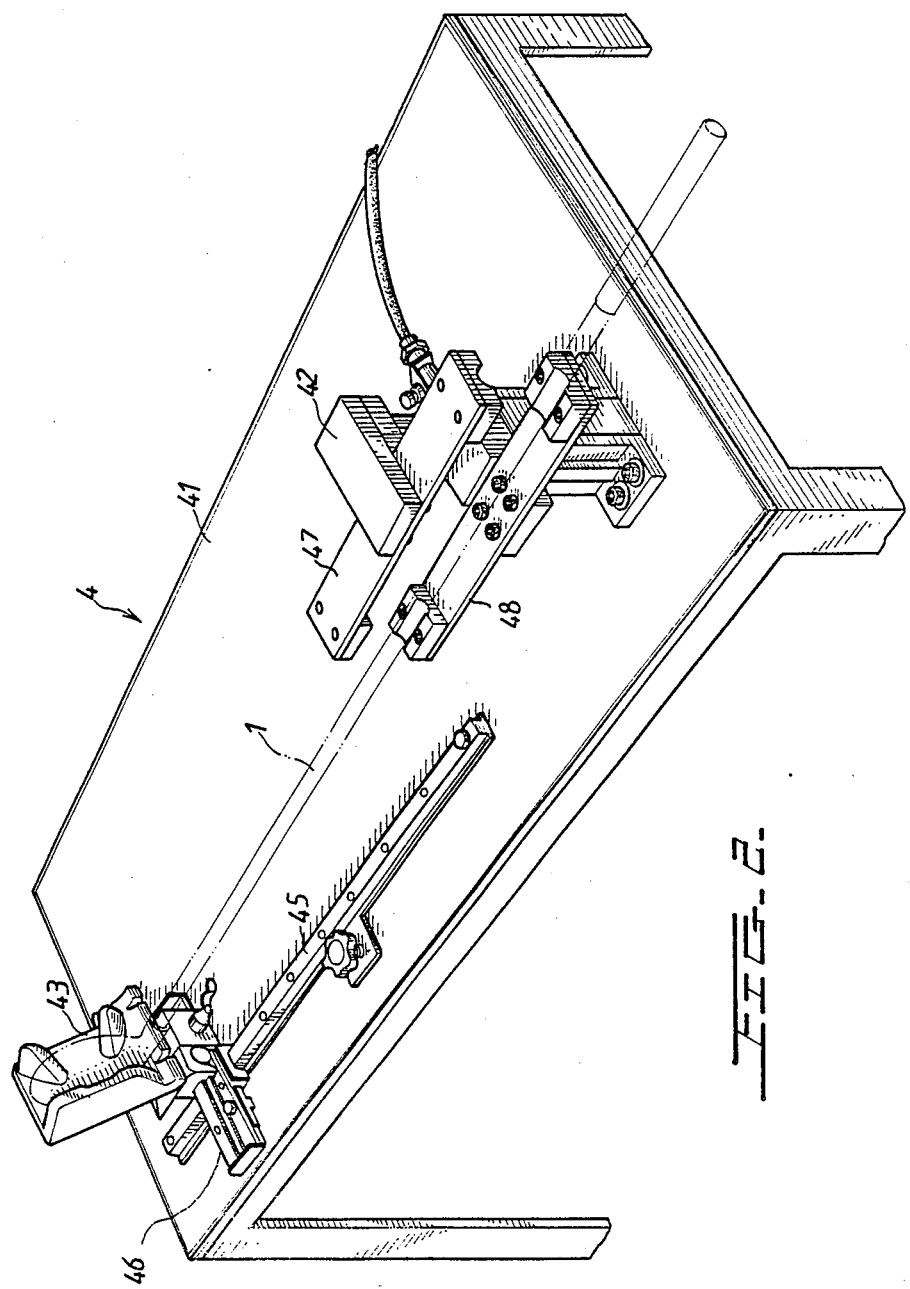
FIG. 2 is a perspective view of a golf club supporting table in accordance with the present invention.
Figure 3:
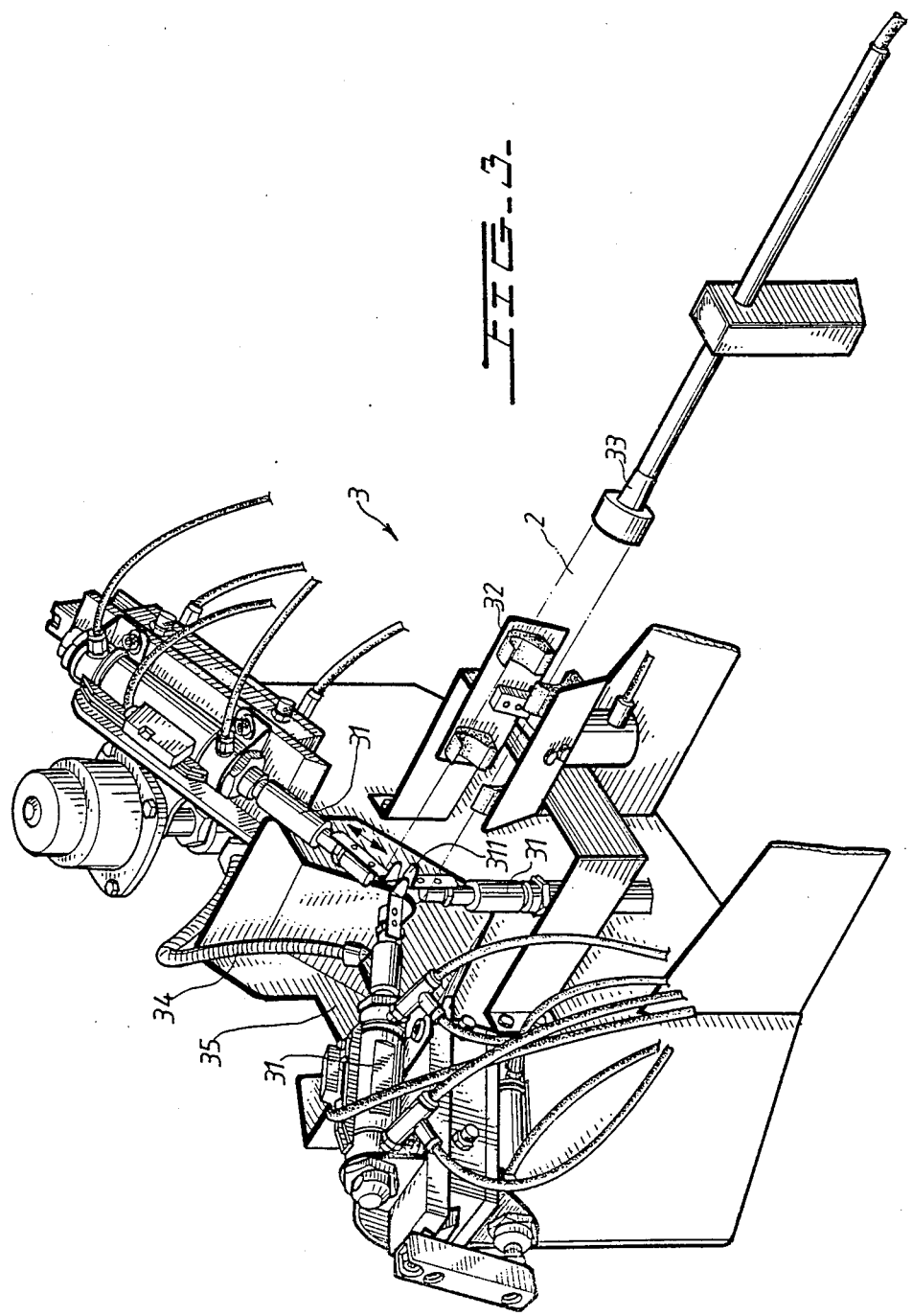
FIG. 3 is a perspective view of a golf club handle sleeve supporting and assembling unit.

Referring to the drawings and initially to FIGS. 1, 2 and 3, it can be understood that a golf club sleeve assembling mechanism in accordance with the present invention comprises generally a golf club supporting table 4, and a golf club handle sleeve supporting and assembling unit 3.

Referring to FIG. 2, the golf club supporting table 4 includes a working table 41, a side table 40, a first clamp device 42, and a head seat 43. The first clamp device 42 is disposed on the working table 41 and actuated by a hydraulic actuator (not shown) so that an upper part 47 is slidable vertically in order to clamp a golf club 1 between the vertically slidable upper part 47 and a stationary lower part 48. The location of the head seat 43 is adjustable along a longitudinal track 45 and a lateral track 46 so that the head seat 43 is suitable for supporting various golf club head of different specifications. The side table 40 is disposed on one side of the working table 41, and is lower than the working table 41.

Referring to FIGS. 1 and 3, the handle sleeve supporting and assembling unit 3 is supported on the side table 40 of the supporting table 4 at a position lower than the surface of the working table 41. The supporting and assembling unit 3 includes a first table 36 slidable longitudinally along a track 38 by means of an actuator 39, and a second table 37 slidable longitudinally relative to the first table 36 by means of an actuator 30 (FIG. 1). A hydraulic actuated second clamp device 32 is disposed on the second table 37 for supporting a golf club handle sleeve 2 to be assembled. Practically, a front end of the handle sleeve 2 is open for receiving the handle portion of the golf club 1, and an opening is formed in a rear end of the handle sleeve 2. An air blower 33 is supported on the first table 36 and aligned with the handle sleeve 2 so as to blow air into the opening of the rear end of the handle sleeve 2 for swelling the handle sleeve 2. Three actuators 31, each having a draw hook 311, are substantially radially distributed around the sleeve 2 at a front end thereof for expanding the front end of the sleeve 2 so that the free end of the golf club 1 can be inserted into the handle sleeve 2 easily. A fluid hose 34 is disposed on the left side of the actuators 31 to deliver volatile solvent or lubricant on the golf club handle portion for facilitating the insertion of the golf club handle portion into the handle sleeve 2. A fluid collector 35 is disposed under the fluid hose 34 to collect the volatile solvent. The actuators 31, the fluid hose 34 and the fluid collector 35 are disposed on the second table 37. A control box 6 is disposed on the first table 36 or the working table 4 for controlling the circulation of the hydraulic fluid to the actuators. The hydraulic system for operating the actuators 30, 31, 39 used in the assembling mechanism in accordance with the present invention can be easily achieved by the present technology, which will not be described with further details.

Referring to FIGS. 1 and 4, illustrating the operations of the golf club handle sleeve assembling mechanism in accordance with the present invention. The assembling processes are described as follows. First, the golf club 1 is suitably clamped by the first clamp device 42 at a substantially intermediate position thereof, and the head of the golf club 1 is supported on the head seat 43. The handle sleeve 2 to be assembled is clamped by the second clamp device 32 and aligned with the golf club 1. The hooks 311 of the actuators 31 are initially disposed in the front end of the handle sleeve 2. The unit 3 is initially located at a rightmost position as shown in FIG. 1. The air blower 33 is aligned with the handle sleeve 2 at a rear end thereof.

Them the actuators 31 retract a small distance so as to expand the front end of the handle sleeve 2. The first table 36 starts moving leftward from the position as shown in FIG. 1. At the same time, the fluid hose 34 starts applying volatile solvent onto the handle portion of the golf club 1 for facilitating the insertion of the golf club 1 into the handle sleeve 2. When the free end of the golf club 1 reaches the front end of the handle sleeve 2, the front end of the handle sleeve 2 is blocked, and the air blower 33 starts blowing air into the handle sleeve 2 for swelling the handle sleeve 2 and facilitating the insertion of the handle portion of the golf club into the handle sleeve 2. At this moment, the second table 37 is still fixed relative to the first table 36.

After the handle portion of the golf club 1 is inserted into the handle sleeve 2, the actuators 31 extend toward the handle sleeve 2 to release the handle sleeve 2. Then, the second table 37 moves leftward relative to the first table 36 so that the hooks 311 can be drawn out of the handle sleeve 2. Therefore, the handle sleeve 2 can be easily assembled onto the golf club 1.

Accordingly, the present invention has the following advantages:

(a) No skilled operators are required.

(b) The assembling speed is fast and the operation is accurate.

(c) Therefore, the productivity is improved, the cost is lowered, and the marketing capability is increased remarkably.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A golf club handle sleeve assembling mechanism comprising a working table, having a first clamp device provided for clamping a golf club, and a head seat provided for supporting a golf club head; and a handle sleeve supporting and assembling unit being disposed on one side of said working table; said handle sleeve supporting and assembling unit including a first table slidable longitudinally relative to said golf club by means of a first actuator, a second table slidable relative to said first table by means of a second actuator, a second clamp device being disposed on said second table for clamping a handle sleeve, triple actuators each having a respective draw hook provided radially around said handle sleeve at a front end thereof for expanding said front end of said handle sleeve, said triple actuators being disposed on said second table, an air blower being disposed on said first table and aligned with said handle sleeve, and a control box being provided on said first table for controlling said actuators, said triple actuators and said air blower; said air blower starting to blow air into a rear end of said handle sleeve for expanding said handle sleeve when said front end of said handle sleeve contacts a handle portion of said golf club and is blocked thereby.

2. A golf club handle sleeve assembling mechanism as set forth in claim 1, wherein a longitudinal track and a transverse track are provided for adjusting a location of said head seat, said longitudinal track is parallel to said golf club.

3. A golf club handle sleeve assembling mechanism as set forth in claim 1, wherein a fluid hose and a fluid collector are further provided adjacent to said triple actuators; said fluid hose delivers fluid to said handle portion of said golf club for facilitating an insertion of said handle sleeve onto said handle portion of said golf club, and said fluid collector collects said fluid.

4. A golf club handle sleeve assembling mechanism as set forth in claim 3, wherein said fluid is a volatile solvent.

* * * * *